Feb. 25, 1936.  M. P. WHITNEY  2,031,994

COASTER BRAKE FOR BICYCLES

Filed May 29, 1935

Witness:
Burr W. Jones

INVENTOR.
Maurice P. Whitney
BY Clinton S. Jones
ATTORNEY.

Patented Feb. 25, 1936

2,031,994

UNITED STATES PATENT OFFICE 2,031,994

COASTER BRAKE FOR BICYCLES

Maurice P. Whitney, Elmira, N. Y., assignor to Eclipse Machine Company, Elmira, N. Y., a corporation of New York Application May 29, 1935, Serial No. 24,154

5 Claims. (Cl. 192—6)

The present invention relates to coaster brakes for bicycles or the like and more particularly to provisions for facilitating the lubrication thereof.

It is an object of the present invention to provide a novel lubricating device for coaster brakes which is simple and inexpensive to incorporate in conventional brake structure, and is convenient and efficient in use.

It is another object to provide such a device which is substantially dust and dirt proof, but readily accessible when required.

It is a further object to provide such a device which does not incorporate any exposed projections or protuberances, nor interfere in any way with devices for maintaining the polish of the hub.

Further objects and advantages will be apparent from the following description taken in connection with the accompanying drawing in which.

Figure 1:
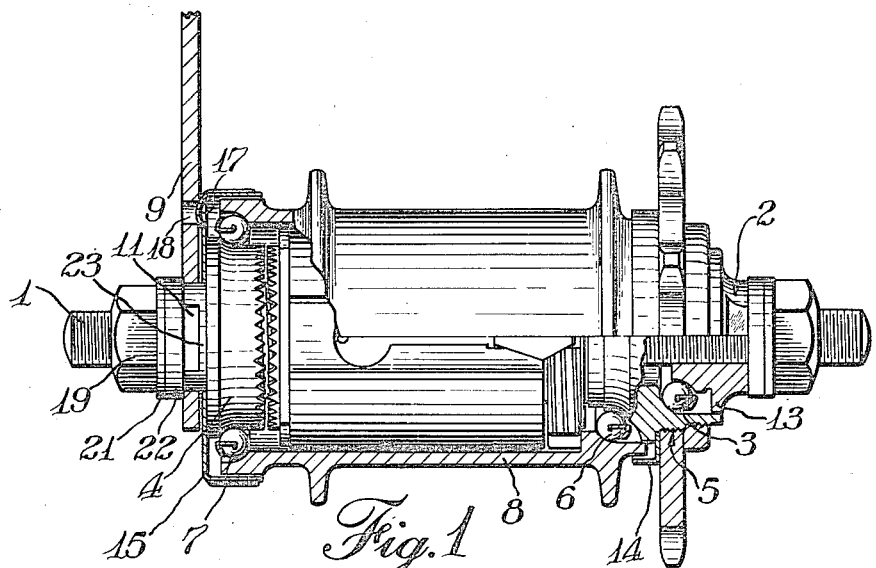
Fig. 1 is a top view partly in section of a commercial form of coaster brake embodying a preferred form of the present invention.
Figures 2, 3:
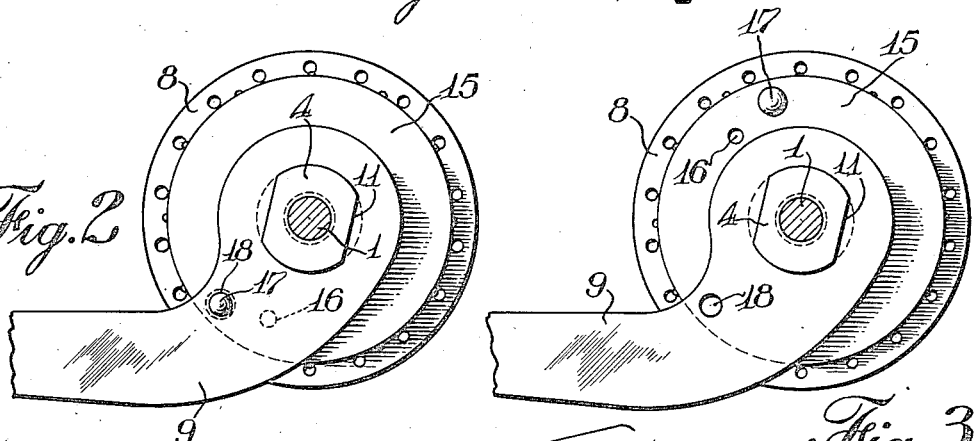
Fig. 2 is an end view of the same with the axle, nut and washers removed, showing the device in normal position.
Fig. 3 is a view similar to Fig. 2 showing the parts in position for permitting lubrication of the brake.
Figure 4:
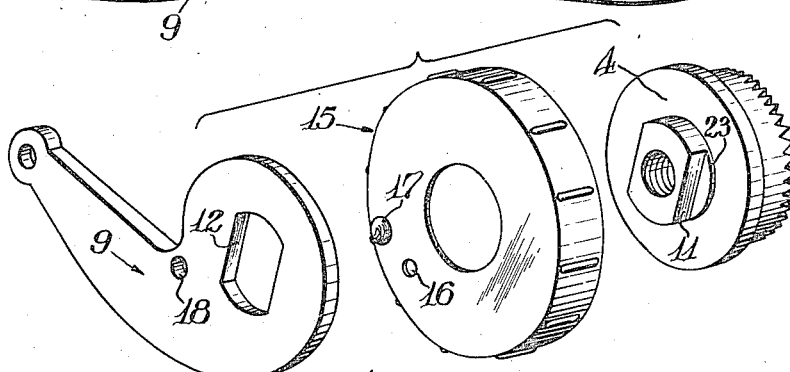
Fig. 4 is a detail in perspective of certain of the parts of the brake embodying the invention, the parts being separated to facilitate the illustration of the invention.

Referring first to Fig. 1 of the drawing, there is illustrated a commercial form of coaster brake for bicycles including an axle shaft 1 on which is threaded a cone bearing member 2 for a ball bearing 3, and a second cone bearing member 4 in the form of a dental clutch and brake anchor member.

A driving sprocket member 5 is provided with a bearing cup surface for receiving the ball bearing 3, and is further formed as a cone for supporting a ball bearing 6. A ball bearing 7 is mounted on the clutch and brake element 4, and a wheel hub 8 is journalled on the bearings 6 and 7. It will be understood that the hub 8 is driven from the sprocket member 5 on forward rotation of the sprocket member, and that braking forces are applied thereto through the clutch and brake element 4 upon rearward rotation of the sprocket member 5 in the usual manner, no description of the operating means being deemed necessary since it is conventional and forms no part of the present invention.

Rotation of the clutch and brake member 4 under braking stresses is prevented by means of a brake arm 9 non-rotatably fixed to the member 4 as by means of a "double-D" section 11 formed thereon and arranged to fit a corresponding opening 12 in the brake arm. Rotation of the brake arm is prevented in the usual manner by suitable attachment of the free end thereof to the frame of the bicycle.

Dust is excluded from the bearing 3 by means of a close running fit between a flange 13 on the bearing cone 2 and the extended portion of the sprocket member 5. The bearing 6 is protected from dust by means of a thimble 14 carried by the sprocket member 5 and overlapping the adjacent end of the hub 8. The bearing 7 is enclosed by means of a dust cap 15 mounted on the clutch and brake member 4 and extending over the adjacent end of the hub 8.

According to the present invention, an aperture 16 is provided in the dust cap 15 for the purpose of permitting the introduction of lubricant within the hub 8 for the purpose of lubricating the bearings 7, 6 and 3. This aperture is normally located underneath the brake arm 9 in order to seal the aperture from dust and dirt. Access is provided thereto, however, by making the dust cap 15 rotatable with respect to the brake and clutch member 4, so that the aperture 16 may be moved to a suitable position for the application of a lubricant dispensing device thereto.

Means are provided for yieldably retaining the dust cap 15 in its normal position in the form of a protuberance 17 formed in the end of the cap and adapted to partially enter an opening 18 in the brake arm 9 so positioned as to act as a detent to resist rotation of the dust cap.

A nut 19 is provided on the axle 1 for clamping the brake in the bicycle frame, not shown, which clamping pressure is transmitted through the washers 21 and 22 to the brake arm 9. In order to prevent seizing of the dust cap 15 between the brake arm and the brake member 4, the "double-D" section 11 of the brake member is arranged to extend only part way across the projecting portion of the member 4, leaving a flange 23 forming an abutment for the brake arm 9 and a journal for the dust cap 15.

In utilizing the present device for lubricating the brake, it is merely necessary to lay the bicycle on its side with the brake arm up, and rotate the dust cap 15 by hand until the aperture 16 is exposed. Liquid lubricant introduced therethrough traverses the entire device, readily finding its way to the three bearings 7, 6 and 3. The cap 15 is then returned to its normal position whereupon the brake is again sealed against intrusion of foreign matter.

It will be noted particularly that this arrangement does not require the application of any additional element or projection on the device and will not interfere in any way with polishing the hub or the action of any cleaning device such as a strap mounted thereon for the purpose of keeping the hub clean and bright.

Although but one embodiment of the invention has been shown and described in detail, it will be understood that changes may be made in the precise form and arrangement of the elements without departing from the spirit of the invention as set forth in the claims appended hereto.

What is claimed is:

1. In a coaster brake an axle, a brake member mounted thereon, a hub journalled on the brake member, a cap sealing the bearing between the hub and brake member, a brake arm non-rotatably connected to the brake member adjacent said cap, said cap having an opening to admit lubricant into the hub, the opening being normally covered by said arm, said cap being rotatable to permit access to said opening.

2. In a coaster brake an axle, a brake member threaded thereon, a wheel hub journalled on the brake member, a cap sealing the bearing between the hub and brake member and rotatably mounted on the brake member, a brake arm non-rotatably connected to the brake member adjacent said cap, said cap having an opening to admit lubricant into the hub, the opening being normally covered by said arm, and means for yieldably retaining the cap in its normal position.

3. In a coaster brake an axle, a brake member threaded thereon, a wheel hub journalled on the brake member, a cap sealing the bearing between the rub and brake member and rotatably mounted on the brake member, a brake arm non-rotatably connected to the brake member adjacent said cap, said cap having an opening to admit lubricant into the hub, the opening being normally covered by said arm, said arm and cap having a recess and a mating projection providing a detent for resisting rotation of the cap.

4. In a coaster brake an axle, a brake member threaded thereon, a wheel hub journalled on the brake member, a dust cap rotatably mounted on the brake member and extending over the hub to seal the bearing between the brake member and hub, a brake arm non-rotatably mounted on the brake member adjacent the cap, means on the axle for clamping the brake arm on the brake member, said brake member having a shoulder forming a bearing for the cap and an abutment for the brake arm, said cap having an opening for admitting lubricant to the interior of the hub, which opening is normally covered by the brake arm.

5. In a coaster brake an axle, a brake member threaded thereon, a wheel hub journalled on the brake member, a dust cap rotatably mounted on the brake member and extending over the hub to seal the bearing between the brake member and hub, a brake arm non-rotatably mounted on the brake member adjacent the cap, means on the axle for clamping the brake arm on the brake member, said brake member having a shoulder forming a bearing for the cap and an abutment for the brake arm, said cap having an opening for admitting lubricant to the interior of the hub, which opening is normally covered by the brake arm, said brake arm having a recess and said cap having a projection adapted to register therewith when the cap is in its normal position.

MAURICE P. WHITNEY.